3,827,876
LUMP ORE PRODUCTS AND METHODS OF MAKING THE SAME
Louis George Imperato, Jr., Tenafly, N.J., assignor to Blocked Iron Corporation, Montrose, N.Y.
Filed Feb. 10, 1969, Ser. No. 797,825
Int. Cl. C21b 1/24; C22b 1/24
U.S. Cl. 75—3                                                5 Claims

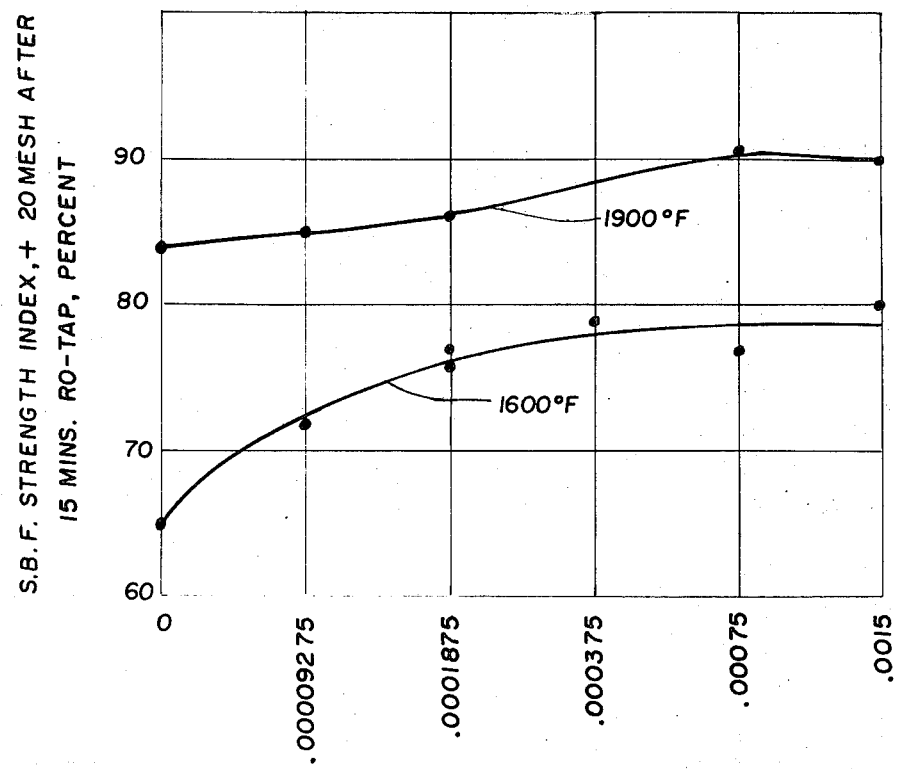
Fig. I

United States Patent Office 3,827,876
Patented Aug. 6, 1974

ABSTRACT OF THE DISCLOSURE

A method of forming lump ores is provided which includes the steps of admixing a finely divided metal containing ore with an oxide or hydroxide of an alkaline earth metal, and a small amount of sulfur together with sufficient moisture to permit formation of aggregates such as lumps, pellets or blocks, forming the mix into aggregates, reducing the moisture to below 10%, subjecting the aggregates to carbon dioxide atmosphere to convert a substantial part of the alkaline earth metal oxide or hydroxide to carbonate *in situ*, and recovering the aggregate ore product so formed.

---

This invention relates to lump ore products and methods of making the same and particularly to a high strength lump ore made from metal containing fines.

The need for a high strength lump ore suitable for use in metallurgical furnaces such as blast furnaces, open hearth furnaces and the like is well known.

Natural, high-grade ores have been in large measure used up over years of production; and the present sources of ore are generally of low grade and must be beneficiated. Such low-grade, beneficiated ores are generally finely divided materials unsuited for charging into metallurgical furnaces. These finely divided ores must be formed into lumps in some manner to make them suited for use. Many methods have been preposed such as, for example, sintering, briquetting with organic binders such as sugar, molasses and the like, forming lump ores with carbon dioxide and the like. In many of these cases, the product will not stand up under weather or handling in others the expense is excessive and in most the product, even though strong when cold, rapidly loses strength and disintegrates at elevated temperatures. Of all existing methods that of forming lumps with a carbonate bond has the fewest disadvantages.

The present invention is directed to an improvement on the carbonate bond process and to a product which has improved strength at elevated temperatures. The product of the present invention has all of the properties of carbonate bonded pellets or lumps disclosed in my patent 2,996,372 and, in addition, has higher strength at high temperatures. This is a highly desirable characteristic, particularly for pellets to be used as a portion of the charge for a blast furnace. The practice of this invention does not appear to significantly change the cold physical strength of pellets or lumps, but it does significantly increase the strength of the pellets or lumps at high temperatures.

In a preferred practice of my invention, I admix a finely divided ore with an oxide or hydroxide of an alkaline earth metal and finely divided sulfur, moisten and form the mixture into aggregates, such as lumps, reduce the moisture in the aggregates below 10%, and subject the formed lumps to an atmosphere of carbon dioxide until a substantial amount of the oxide or hydroxide of alkaline earth metal is converted to carbonate *in situ*. Preferably, the ore portion of the mixture is in the range of 60% to 95% of the mixture; the alkaline earth oxide or hydroxide is 4.5% to 39.5%; the sulfur is 0.00005% to 0.005% and the balance water, but not to exceed 10% of the weight of the mixture at the time of carbonation. The alkaline earth oxide or hydroxide preferably may be calcium oxide, magnesium oxide, mixtures of calcium and magnesium oxide, e.g. dolomitic mono-hydrate, magnesium hydroxide, calcium hydroxide and the like. The ore may be any of the fine particle ore concentrates, rolling-mill scale, ground ores and the like.

In the foregoing general description of this invention, I have set out certain objects, advantages and purposes of this invention. Other objects, purposes and advantages will be apparent from a consideration of the following description and the drawing showing the influence of the addition of sulfur on the high temperature strength of carbonate bonded pellets.

92.5% by weight of Lac Jeannine Concentrate, made up of 20% unground concentrates and 80% concentrates ground to 80% below 325 mesh was mixed with 7.5% by weight of dolomitic mono-hydrate. To this mixture was added varying amounts of sulfur and about 7.0% of water. The several mixtures were formed into pellets having a size consist of minus ⅝" to plus ⅜". The moisture content within the pellets was then reduced to 2–3% and the pellets were placed in an atmosphere of carbon dioxide gas until a substantial portion of the alkaline earth metal was formed into alkaline earth metal carbonates *in situ*. The pellets were cooled and their compression strength was measured. The pellets were then tumble tested (5 lbs./200 revs.) and the percentage above ¼" determined. Finally, the SBF strength index after rotapping 15 minutes was determined as described in my Pat. No. 3,382,063 issued May 7, 1968. The pertinent data is set out in Table I hereinbelow and graphed on the attached drawing.

TABLE I

| Percent added sulfur | Compression strength, avg., lbs. | Tmble test, 5 lbs./200 revs., percent plus ¼" | SBF strength index after 15 minutes rotapping, percent plus 20M | |
|---|---|---|---|---|
| | | | 1,600° F. | 1,900° F. |
| None | 159 | 95 | 65 | 84 |
| 0.00009375 | 150 | 95 | 72 | |
| | 154 | 96 | 72 | 85 |
| 0.0001875 | 160 | 95 | 76 | |
| | 182 | 96 | 77 | 86 |
| 0.000375 | 178 | 97 | 79 | |
| 0.00075 | 157 | 97 | 77 | 91 |
| 0.0015 | 175 | 97 | 80 | 90 |
| | 173 | 96 | 80 | |

A series of tests using magnetite concentrate was made as follows:

92.5% by weight of magnetite concentrate was mixed with 7.5% by weight of dolomitic mono-hydrate. To this mixture was added about 10% by weight of water and the mixture was divided into two parts. To the second part an additional 0.001% sulfur was added and mixed. The two separate mixtures were formed into two groups of pellets having a diameter of about ½". The moisture content was reduced to between 2–3% and the pellets placed in an atmosphere of carbon dioxide until a substantial part of the alkaline earth metal was converted to alkaline earth metal carbonate *in situ*.

The pellets were tested as described above and the results appear in Table II.

TABLE II

| Percent added sulfur | Compression strength, avg., lbs. | Tumble test, 5 lbs./200 revs. percent plus ¼" | SBF strength index after 15 minutes rotapping, percent plus 20M, 1,600° F. |
|---|---|---|---|
| None | 147 | 95 | 54 |
| 0.001 | 127 | 93 | 75 |

From the foregoing test data it will be noted that the addition of sulfur while having a slight improvement in tumble test, markedly improved the SBF strength index which is a measure of high temperature performance and is indicative of the ability of the pellet to satisfactorily withstand the temperatures and pressures of a blast furnace.

Coal or like fuel may be added as described in my Pat. 3,382,063 without detrimental affecting the product.

In the foregoing specification I have described certain preferred practices and embodiments of my invention, however, it will be understood that this invention may be otherwise embodied within the scope of the following claims.

I claim:

1. A low temperature method of making ore aggregates such as lumps and pellets having high strength at elevated temperatures comprising the steps of:
   (a) admixing finely divided metal containing ore with one of the group consisting of oxides and hydroxides of an alkaline earth metal, a small amount of free sulfur and sufficient water to form the mass into aggregates;
   (b) forming the mixture into aggregates;
   (c) reducing the moisture level in the aggregates below 10%;
   (d) subjecting the formed aggregates to an atmosphere of carbon dioxide until a substantial portion of the alkaline earth metal is converted to alkaline earth carbonate *in situ;* and
   (e) removing the formed aggregates to the atmosphere for storage and use.

2. The method as claimed in claim 1 wherein the amount of sulfur is between about 0.00005% and 0.005% by weight of the mixture.

3. The method as claimed in claim 1 wherein the alkaline earth metal oxide and hydroxide is substantially all converted to carbonate.

4. A lump ore product consisting essentially of a finely divided metal containing ore, a small amount of free sulfur, less than 10% water and a bond of alkaline earth carbonate formed *in situ.*

5. A lump ore product as claimed in claim 4 wherein the sulfur content is about 0.00005 to 0.005%.

References Cited

UNITED STATES PATENTS

| | | | |
|---|---|---|---|
| 2,844,457 | 7/1958 | Amberg | 75—3 |
| 3,027,251 | 3/1962 | Schaefer et al. | 75—3 |
| 3,370,936 | 2/1968 | Johnson et al. | 75—3 |
| 3,503,734 | 3/1970 | Bell | 75—5 |

FOREIGN PATENTS

| | | | |
|---|---|---|---|
| 730,091 | 3/1966 | Canada | 75—5 |
| 882,456 | 11/1961 | Great Britain | 75—3 |

ALLEN B. CURTIS, Primary Examiner